A. C. JOHNSON.
TRACTOR WHEEL.
APPLICATION FILED JUNE 18, 1919.

1,389,875.

Patented Sept. 6, 1921.

INVENTOR
Alfred C. Johnson
BY John A. Naismith
HIS ATTORNEY

UNITED STATES PATENT OFFICE.

ALFRED C. JOHNSON, OF WINTERS, CALIFORNIA.

TRACTOR-WHEEL.

1,389,875. Specification of Letters Patent. Patented Sept. 6, 1921.

Application filed June 18, 1919. Serial No. 304,991.

*To all whom it may concern:*

Be it known that I, ALFRED C. JOHNSON, a citizen of the United States, and a resident of Winters, in the county of Yolo and State of California, have invented certain new and useful Improvements in Tractor-Wheels, of which the following is a specification.

This invention relates to a traction member intended for use on the wheels of tractors designed to operate in soft ground for the purpose of drawing plows or similar agricultural implements.

Prior to this invention it was thought that, in order to secure satisfactory results in the operation of tractors designed to draw heavy loads over ground of the character indicated, the tractor wheel surface must be sufficiently exposed to direct contact with the soft or loose ground to pack down the underlying soil around the embedded spuds, so that the latter would press against a sufficiently dense and compact soil to secure the necessary gripping action. Since the object of plowing and working the soil is to render it loose and friable it is clear that the compacting of the soil as indicated is detrimental thereto.

It is the object of my invention to provide a tractor wheel element, and tractor wheel, of such a form and construction and proportion that a positive grip may be secured upon loose soil without submitting the same to undue vertical compression and with a minimum disturbance thereof. Another object is to provide a means of the nature indicated whereby a sufficient anchorage of the tractor may be secured to permit the use of a comparatively light tractor for heavy work.

Figure 1:
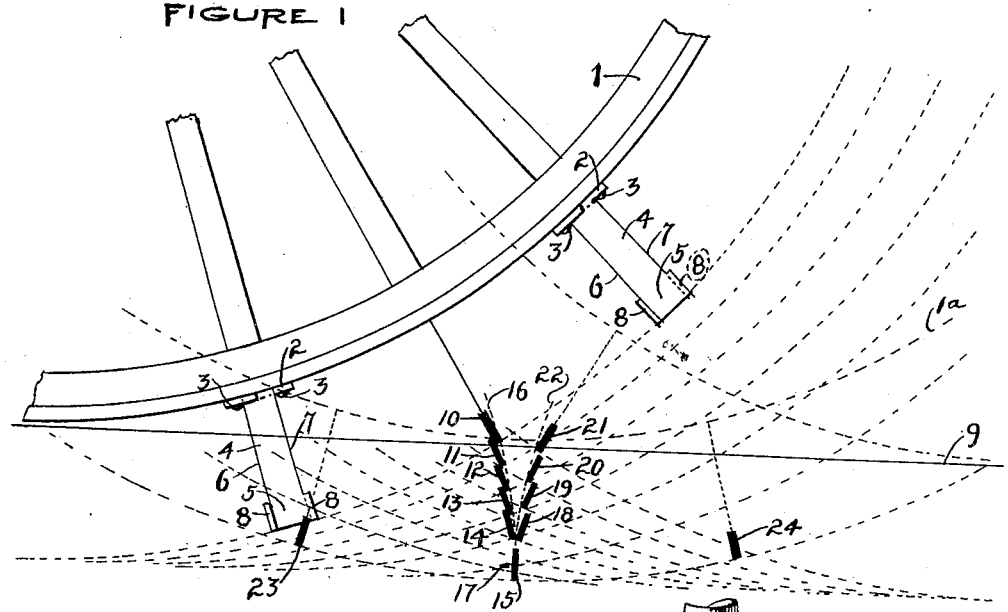
Figure 1 is an illustration showing the relative positions of several of my improved traction elements on a portion of a wheel body and illustrating their action when in use.
Figure 2:
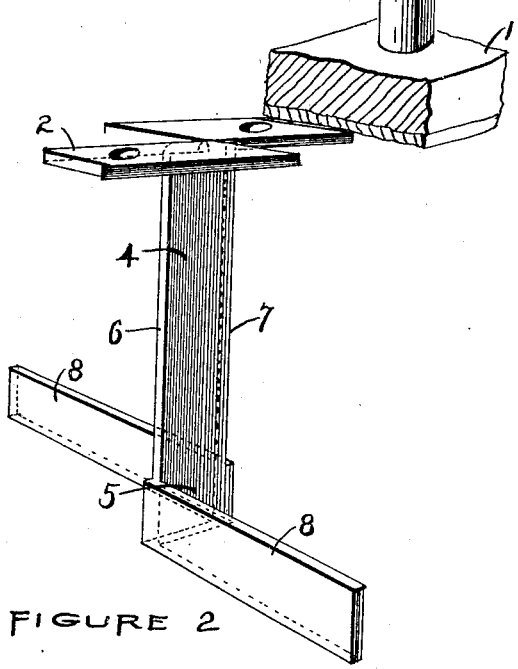
Fig. 2 is a perspective view of one of the elements shown in Fig. 1 operatively positioned with relation to a fragment of a wheel body.

In the drawing, 1 indicates a portion of a wheel body. Arranged at suitable intervals around the periphery of the body 1 are the traction elements forming the basis of this invention, each element having a base portion 2 secured to wheel body 1 by bolts 3 and having an outwardly extending shank 4 carrying head 5. The several shanks 4 lie in a plane parallel with the plane of rotation of the wheel and bisecting the rim thereof, each shank having front and rear cutting edges 6 and 7, and a thin non-resisting body portion as shown. The head 5 is provided with laterally extending blades 8 preferably extending a distance beyond the sides of wheel body 1 and having thin outer edges to facilitate their entrance into the soil. In order to function as herein set forth the head 5 should be spaced from the rim of wheel body 1 a distance not less than the width of said head, the proportion of head to shank being preferably greater than 1 to 3.

In operation the head 5 enters the soil 9 as indicated at 10 and passes downwardly to the vertical position 15 through the arc 16. Since the wheel body 1 is rolling forwardly as head 5 descends, the arc 16 is quite flat and the outer edges of blades 8 penetrate the soil with but little resistance. As head 5 enters the soil and passes through the several positions 11—12—13 and 14 to 15 its propulsive effectiveness increases until it reaches a maximum of efficiency in the position 15 where its full surface 17 is utilized to apply pressure to the soil parallel to the line of travel of the tractor. When, however, the head 5 passes the position 15 its effectiveness rapidly diminishes because the head following is approaching its maximum effectiveness. The result of this action is that head 5 passes upwardly and out of the soil through positions 18—19—20 and 21, describing the flat arc 22 and performing practically no other work than crowding the small wedge of soil lying between the head 5 and arc 22 to one side. The ideal action would be to have each head 5 reach a point in the soil immediately preceding its position of greatest efficiency, and leave the soil at a point just following said position, without friction and it is thought that the construction herein set forth approximates this ideal as closely as may be possible by practical mechanical means. The relative positions of the preceding and following elements when one element is in the position 15, are indicated at 23 and 24 respectively, the position of wheel body 1 at this time being indicated in dotted lines at 1ª.

A light tractor equipped with these elements may be used to perform heavy work for the reason that shanks 4 and blades 8 encounter but little resistance in entering and leaving the soil and reach their greatest efficiency without vertical compression of the soil. The blades 8 are made as thin as practical for the work to be performed by them, and their faces are made sufficiently narrow and long to utilize to the fullest extent the power applied thereto without wastage of power or undue increase in frictional resistance. The shank is made to offer as little resistance as possible to the soil, but with sufficient strength to prevent failure when the blades are exerting their greatest efforts, and of sufficient length to act freely and sufficiently deep in the soil to prevent undue friction of the wheel rim on the surface of the ground.

It is clear from the above description that the wheel rim itself may be greatly reduced in width, and in an extreme case may be made to serve only as a mounting for the several elements.

It may also be said that the relative importance of the several structural features herein set forth are as follows,—1st, the unobstructed length of shank 4 with relation to the width of head 5; 2nd, the thinness and consequently the nonresisting qualities of shank 4 in entering and leaving the soil; 3rd, the length of head 5 with relation to its width whereby a maximum of tractive efficiency is secured with a minimum of resistance in penetrating and withdrawing from the soil.

It is understood of course, that changes in form, construction and proportions may be made within the scope of the appended claims.

I claim:

1. A traction element adapted to be mounted upon the periphery of a tractor wheel and including laterally extending terminal blades of greater width than thickness spaced a distance from the periphery of the wheel greater than the width of said blades, said blades being arranged edgewise with relation to the axis of the wheel, and substantially parallel therewith.

2. A traction element adapted to be mounted upon the periphery of a tractor wheel and including laterally extending terminal blades of greater width than thickness spaced a distance from the periphery of the wheel greater than the width of said blades, said blades being arranged edgewise with relation to the axis of the wheel and having their longer edges formed to offer negligible resistance to the soil through which they pass.

3. A traction element adapted to be mounted upon the periphery of a tractor wheel and including an elongated shank of greater width than thickness lying in the plane of rotation of the wheel when operatively mounted thereon and having front and rear edges formed to offer negligible resistance to the soil through which it passes, and laterally extending terminal blades of greater width than thickness mounted on said shank and spaced a distance from the periphery of the wheel greater than the width of said blades, said blades being arranged edgewise with relation to the axis of the wheel.

4. A traction element adapted to be mounted upon the periphery of a tractor wheel and including an elongated shank of greater width than thickness lying in the plane of rotation of the wheel when operatively mounted thereon and having front and rear edges formed to offer negligible resistance to the soil through which it passes, and laterally extending terminal blades of greater width than thickness mounted on said shank and spaced a distance from the periphery of the wheel greater than the width of said blades, said blades being arranged edgewise with relation to the axis of the wheel and having their inner and outer edges formed to offer negligible resistance to the soil through which they pass.

5. A traction element for tractor wheels comprising a head having laterally and oppositely extending blade portions, and means for rigidly mounting the same upon the periphery of a wheel at a distance therefrom greater than the width of said head, said mounting means being formed to offer a minimum of resistance to the soil through which it passes.

6. The combination of a vehicle wheel, shanks of greater width than thickness rigidly mounted thereon and radiating relative to said wheel and having their front and rear edges in circumferential alinement and formed to offer negligible resistance to the soil through which they pass, and laterally extending terminal blades of greater width than thickness carried by said shanks and presenting edges formed to offer negligible resistance to the soil through which they pass, said blades being spaced a distance from the periphery of the wheel greater than the width of any blade whereby traction is secured a distance below the surface over which the wheel moves.

7. A traction element for tractor wheels comprising a head having laterally and oppositely extending blade portions, and means for rigidly mounting the same upon the periphery of a wheel at a distance therefrom greater than the width of said head, said mounting means being formed to offer a minimum of resistance to the soil through which it passes, and said blade portions being formed to offer a minimum of resistance to the soil through which they pass.

8. The combination of a vehicle wheel and a plurality of circumferentially positioned tractor elements radially arranged thereon, each element consisting of an elongated shank carrying terminal blades positioned edgewise to the wheel axis and substantially parallel thereto and having their longer edges formed to offer negligible resistance to the soil through which they pass.

In testimony whereof I have hereunto affixed my signature this 11th day of June, 1919.

ALFRED C. JOHNSON.